(12) United States Patent
Emigh

(10) Patent No.: US 7,712,142 B1
(45) Date of Patent: May 4, 2010

(54) DOCUMENT INTEGRITY

(76) Inventor: Aaron T. Emigh, 762 Judith Ct., Incline Village, NV (US) 89451

( * ) Notice: Subject to any disclaimer, the term of this patent is extended or adjusted under 35 U.S.C. 154(b) by 1221 days.

(21) Appl. No.: 11/222,731

(22) Filed: Sep. 10, 2005

(51) Int. Cl.
*G06F 7/04* (2006.01)
*G06F 17/20* (2006.01)

(52) U.S. Cl. .................................. 726/26; 715/234

(58) Field of Classification Search .................. None
See application file for complete search history.

(56) References Cited

U.S. PATENT DOCUMENTS 7,299,408 B1 * 11/2007 Daconta et al. ............. 715/234

* cited by examiner

*Primary Examiner*—Brandon S Hoffman

(57) ABSTRACT

In some embodiments, techniques for document integrity may include detecting an initiator associated with a key, detecting the end of a document, determining that no terminator matching the key has been detected, and rejecting all or part of the document.

In some embodiments, techniques for document integrity may include generating a key and associating the key with an initiator insertion point and a terminator insertion point.

72 Claims, 5 Drawing Sheets

DOCUMENT INTEGRITY

FIELD OF THE INVENTION

The present invention relates generally to the area of computer security. More specifically, techniques for protecting document integrity are disclosed.

BACKGROUND OF THE INVENTION

Electronic documents are used for a wide variety of applications. In many cases, electronic documents incorporate content that may be erroneous. Examples of such potentially erroneous content include content received from an external source, such as a vendor, partner or user. Such content can compromise the integrity of a document with which it is associated. Many forms of such compromises are possible. Examples include content injection such as cross-site scripting, SQL injection and HTTP response splitting. Some such compromises include erroneously ending a document, an element of a document, or metadata associated with a document. Compromises to the integrity of documents have been used for malicious and/or fraudulent purposes.

The absence of a mechanism for protecting the integrity of documents and/or their associated elements and/or metadata leaves the door open for many such compromises. Accordingly, it would be useful to be able to protect the integrity of electronic documents.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
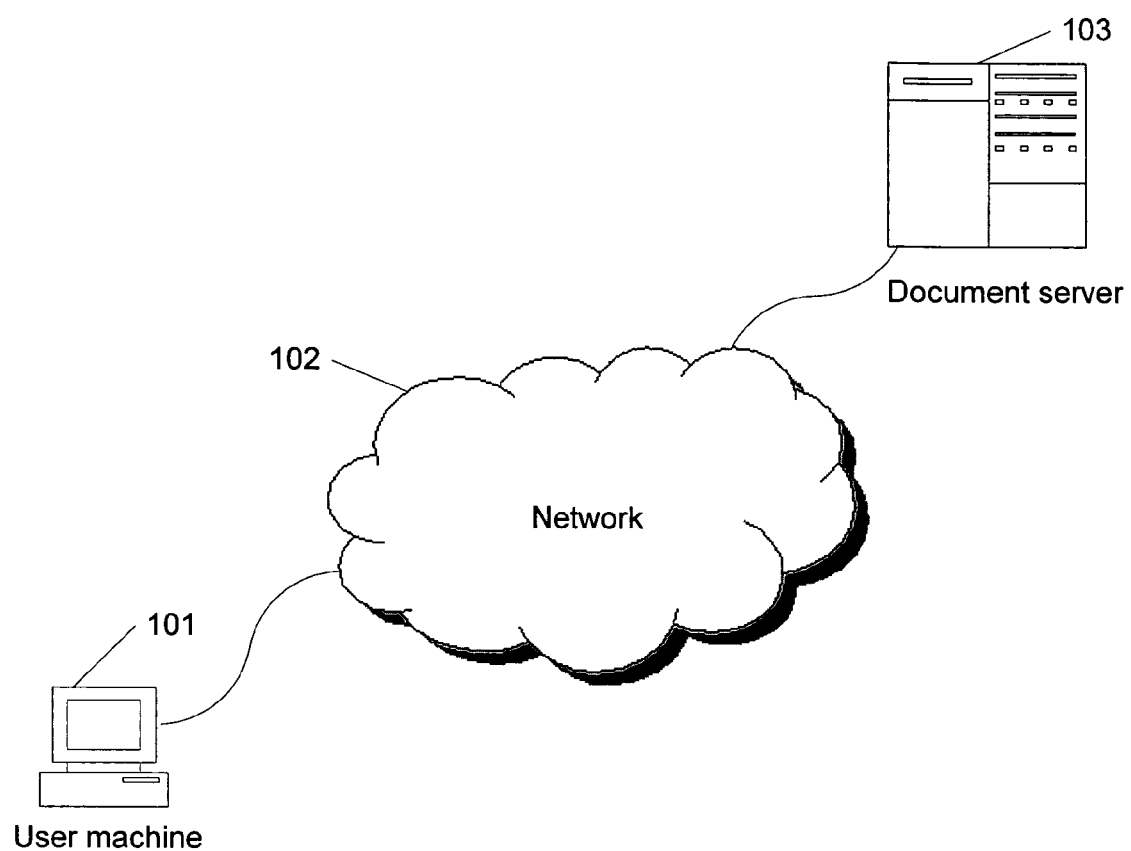
FIG. 1 is a diagram of a system for distributing and receiving a document with ensured integrity, according to some embodiments.

FIG. 1 is a diagram of a system for distributing and receiving a document with ensured integrity, according to some embodiments. In this example, a user machine 101 may be connected to a network 102. A user machine may be any user-operated device capable of performing programmed information processing. Examples of a user machine include a personal computer, a PDA, an internet appliance, and a cell phone. In some embodiments, a user machine 101 may receive a document through the network 102 from a document server 103. A document refers herein to any electronic data with an intrinsic structure. Examples of a document include as a web page, a word processing document, a spreadsheet, a database file or a record or table in a database, markup data such as HTML, SGML or XML, an image, and a document associated with a page description language such as a PDF or a Postscript file. A document may also refer herein to metadata associated with a document, such as an HTTP header. In some embodiments, a document may be transmitted using a document transmission protocol, such as HTTP, FTP, and/or a lower-level protocol such as UDP/IP or TCP/IP.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet.

A document server 103 may be connected to the network 102. The document server 103 may be any entity capable of providing a document, such as a web server that provides a document through a protocol such as HTTP. The document server 103 may provide a document that includes one or more embedded initiators and terminators. In some embodiments, the document server 103 may insert one or more embedded initiators and/or terminators.

Further details of the operation of this FIG. 1 are discussed in conjunction with the remaining Figures.

Figure 2:
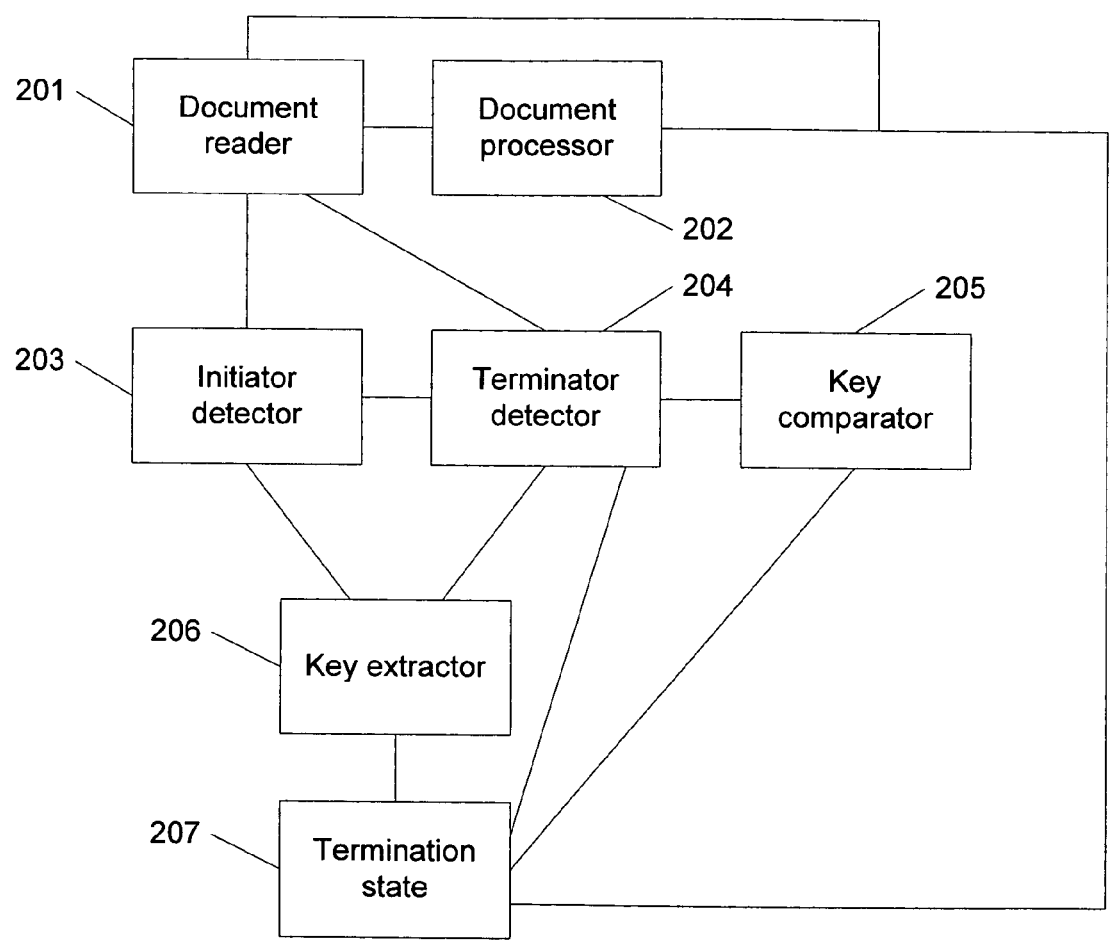
FIG. 2 is a diagram of a system for protecting document integrity, according to some embodiments.

FIG. 2 is a diagram of a system for protecting document integrity, according to some embodiments. In some embodiments, the system of this Figure may be associated with a user machine 101 of FIG. 1, for example with a document browser such as a web browser, word processor or PDF viewer. In this example, a document reader 201 reads a document, for example over a network such as network 102 of FIG. 1, or from local storage such as a disk. Reading a document over a network may include the use of one or more network protocols of various layers, such as HTTP and/or TCP/IP. A document processor 202 may perform processing tasks associated with the document, such as rendering and/or displaying the document, or passing data to an external processor.

An initiator detector 203 may detect an initiator. An initiator refers herein to an initiation of a region of a document or document element, which may be ended with a corresponding terminator, or by the end of the document. An example of an initiator associated with an HTML document is the <HTML> tag, which signals the beginning of HTML. An initiator may be augmented with a key, for example by including the key in the initiator. An example of including a key in an <HTML> tag is <HTML KEY="xxx">, wherein "xxx" is a key, such as a randomly generated key. An example of an initiator for an element within an HTML document is a <FORM> tag, which may be augmented with a key, for example of the form <FORM KEY="xxx">. The use of the <FORM> tag in this example is illustrative, and any other element type may be used, such as <DIV>, <TABLE> or <IFRAME>. Another example of an initiator is an initiator in an HTTP header, for example a line in an HTTP header such as "Termination-Token: xxx", wherein "xxx" is a key, such as a randomly generated key.

A terminator detector 204 may detect a terminator, for example a terminator corresponding to an initiator detected by an initiator detector 203. A terminator refers herein to a termination of a region of a document or document element, which may have been begun with an initiator. An example of a terminator associated with an HTML document is the specified end of an <HTML> tag, e.g. an </HTML> tag. A terminator may be augmented with a key, for example by including the key in the terminator. An example of including a key in a </HTML> tag is </HTML KEY="xxx">, wherein "xxx" is a key, such as a key matching a key used in a corresponding initiator. An example of a terminator for an element within an HTML document is a </FORM> tag, which may be augmented with a key, for example of the form </FORM KEY="xxx">. The use of the </FORM> tag in this example is illustrative, and any other element type may be used, such as </DIV>, </TABLE> or </IFRAME>. Another example of a terminator is a terminator in an HTTP header, for example a line in an HTTP header such as "Terminate-Header: xxx", wherein "xxx" is a key, such as a key matching a key used in a corresponding initiator.

A key extractor 206 may extract a key from an initiator and/or terminator, for example by parsing the key out from document data and/or metadata. An extracted key may be stored in termination state 207, which may include a memory for storing one or more such keys. A key comparator 205 may determine whether a key associated with a terminator matches a key associated with an initiator.

Further details of the operation of this FIG. 2 are discussed in conjunction with the remaining Figures.

Figure 3:
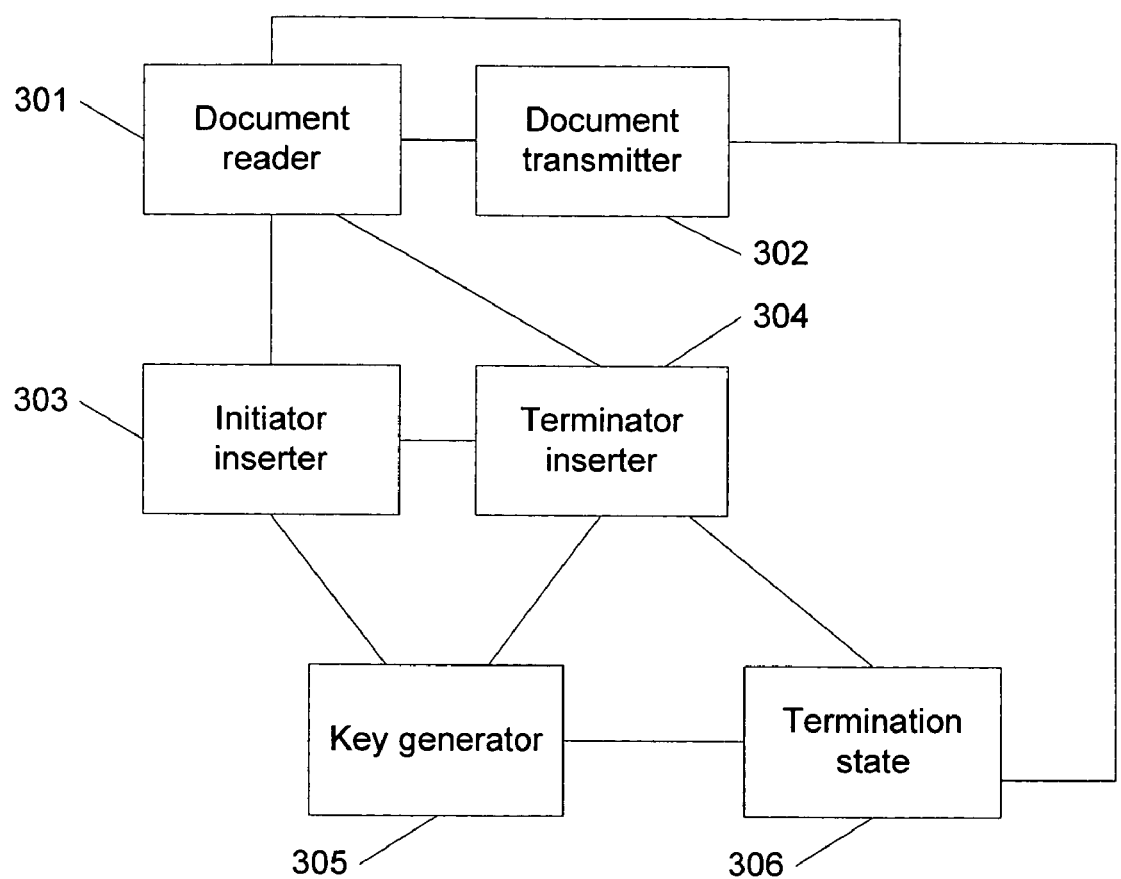
FIG. 3 is a diagram of a system for indicating areas of a document to protect, according to some embodiments.

FIG. 3 is a diagram of a system for indicating areas of a document to protect, according to some embodiments. In some embodiments, the system of this FIG. 3 may be associated with a server such as document server 103 of FIG. 1, for example with a web server. In some embodiments, the system of this FIG. 3 may be performed by computer software associated with document creation and/or management, such as a document editor or content manager. In this example, a document reader 301 may read document data, for example from disk, over a network, or from memory. A document transmitter 302 may transmit the document, for example by storing the document on disk or by sending the document over a network such as network 102 of FIG. 1.

An initiator inserter 303 may insert an initiator with an associated key, or may detect an initiator and insert a key into the initiator. Examples of initiators are discussed in conjunction with 203 of FIG. 2. An example of a key that may be inserted is a key generated by key generator 305.

A terminator inserter 304 may insert a terminator with an associated key, or may detect a terminator and insert a key. A terminator or key associated with a terminator may correspond to an initiator inserted or modified by an initiator inserter 303, for example a key retrieved from termination state 306. Examples of terminators are discussed in conjunction with 204 of FIG. 2.

A key generator 305 may generate a key, for example randomly or according to a sequence that may be difficult for an attacker to guess. Termination state 306 may include one or more generated keys, for example keys generated for an initiator and optionally used in a corresponding terminator.

Further details of the operation of this FIG. 3 are discussed in conjunction with the remaining Figures.

Figure 4:
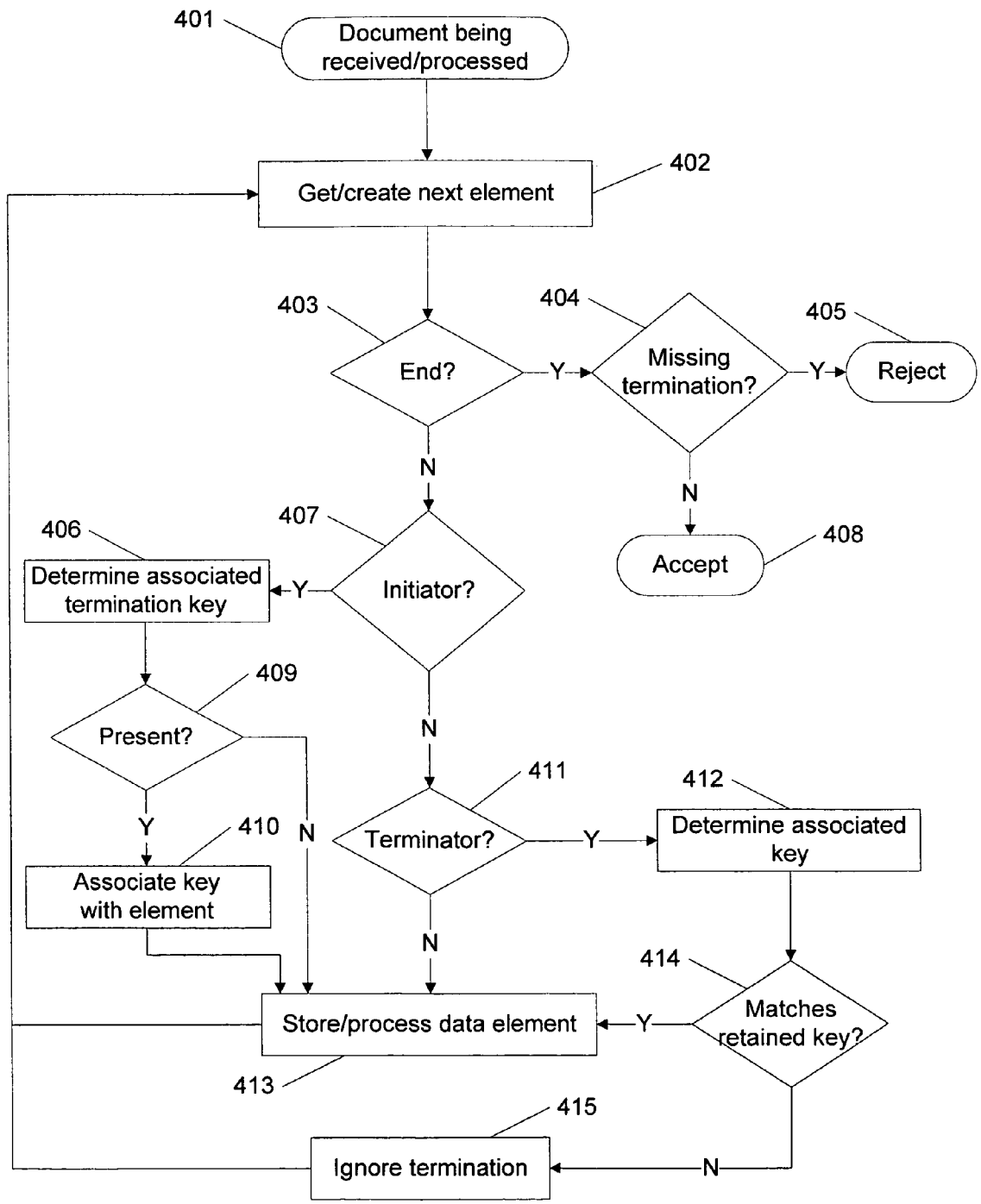
FIG. 4 is a flow diagram of a method for protecting document integrity, according to some embodiments.

FIG. 4 is a flow diagram of a method for protecting document integrity, according to some embodiments. In some embodiments, the method of this Figure may be associated with a user machine 101 of FIG. 1, for example with a document browser such as a web browser, word processor or PDF viewer. In this example, a document is being received and/or processed (401). An example of a document being received is for the document to be received over a network such as network 102 of FIG. 1. Another example of a document being received is for the document to be read from storage, such as magnetic storage. An example of processing a document is to render and/or display the document. Another example of processing a document is to store or forward data associated with the document.

A next element of the document, or a portion of such an element, may be gotten or created (402). An example of an element of a document is a constituent part of a structured document, for example an HTML tag that begins, continues or ends a document element such as a form or table. In some embodiments, an element may nest hierarchically within another element. An example of creating an element is to create a virtual element representing the entire document, for example an entire HTTP header or web page.

It may be determined whether the document has ended (403). An example of determining that the document has ended is for getting a next document element (402) to have failed. Another example of determining that a document has ended is for the element to specify or imply the end of the document.

If it is determined that the document has ended (403), then in this example it is determined whether a termination is missing (404). An example of determining whether a termination is missing is to determine whether an initiator with an associated key has been encountered, for which no corresponding matching terminator (for example, no key with a matching associated key) has been received. If it is determined that a termination is missing (404), then in this example the document is rejected (405). An example of rejecting a document is to not display, store and/or forward the document. Another example of rejecting a document is to quarantine the document. In some embodiments, for example when a missing terminator is associated with an element corresponding to the document, as well as in some embodiments in which the missing terminator is associated with a sub-element of the document, the entire document may be rejected. In some embodiments, for example when the missing termination is associated with a sub-element of the document, element(s) for which an acceptable termination is missing may be rejected, and the document may be accepted without such element(s). If it is determined that no termination is missing (404), then in this example the document is accepted (408). Examples of accepting the document include displaying the document, storing the document, and forwarding document data.

If it is determined that the document has not ended (403), then in this example it is determined whether the element is associated with an initiator (407). Examples of initiators are discussed in conjunction with 203 of FIG. 2. An example of determining whether the element is associated with an initiator is to compare the element, or a name associated with the element, with one or more initiators associated with the document type.

If it is determined that the element is an initiator (407), then in this example an associated termination key is determined (406). Examples of a termination key associated with an initiator are discussed in conjunction with 203 of FIG. 2. If it is determined that there is no associated termination key (409), then in this example the element is stored and/or processed (413), and the next element is gotten or created (402).

If it is determined that there is an associated termination key (409), then in this example the key is associated with the element (410). An example of associating the key with the element is to store the key in a memory such as termination state 207 of FIG. 2, associated with the element. The data element may be stored and/or processed (413), and the next element may be gotten or created (402).

If it is determined that the element is not an initiator (407), then in this example it is determined whether the element is a terminator (411). Examples of terminators are discussed in conjunction with 204 of FIG. 2. If it is not determined that the element is a terminator (411), then in this example the element is stored and/or processed (413), and the next element is gotten or created (402).

If it is determined that the element is a terminator (411), then in this example an associated termination key is determined (412). Examples of a termination key associated with a terminator are discussed in conjunction with 204 of FIG. 2. It may be determined whether the key associated with the terminator matches a key associated with a corresponding initiator, for example an initiator associated with the same document element as the terminator (414). An example of determining whether the key matches is to look up a key used in conjunction with an initiator for the element being terminated in a memory such as termination state 207 of FIG. 2, and determining whether the keys match. An example of matching keys is substantially identical keys, which may include substantially identical non-null or null (e.g. empty or unspecified) keys.

If it is determined that the keys do not match (414), for example if the initiator had an associated key and the terminator did not, or if the initiator and the terminator had different keys, then in this example the termination is ignored (415). An example of ignoring a termination is to consider that subsequent data is associated with the same element of the document.

If it is determined that the keys match (414), then in this example the document element is stored and/or processed (413), and the next element is gotten or created (402). It may be indicated that a terminator matched the initiator, for example by removing a key associated with the initiator from a memory such as termination state 207 of FIG. 2.

To illustrate the operation of this FIG. 4, it may be instructive to consider examples of processing document data. The first such example is of a web browser processing a portion of an HTML document that includes a key associated with an <HTML> tag:

<HTML KEY="cvb098srnwe23">
   [HTML data elements]
   </HTML KEY="cvb098srnwe23">

In this example, when the <HTML> element is gotten (402), it is determined to be an initiator (407), and the associated key, "cvb098srnwe23", is associated with the element (410). Various HTML data elements are stored for later processing (413). The </HTML> tag is determined to be a terminator (411), and its associated key, "cvb098srnwe23", is determined to match the key associated with the matching initiator (414). When the end of the document is encountered (403), it is determined that no termination is missing (404), because the key associated with the initiator was matched in the terminator. The document is therefore displayed (408). In other examples (not shown), a missing or mismatching key associated with the terminator would have caused the terminator to be ignored (415), and the termination would have been determined to be missing (404), causing the document to be rejected (405). This would, for example, protect against a cross-site scripting or SQL injection attack in which injected content provided fraudulent content and a spurious termination to the HTML element.

Another example of document data is of a web browser processing an illustrative HTTP header:

HTTP/1.1 302 Moved Temporarily

Termination-Token: cvb098srnwe23

Date: Wed, 24 Dec. 2003 12:53:28 GMT

Location: http://10.1.1.1/by_lang.jsp?lang=English

Server: WebLogic XMLX Module 8.1 SP1 Fri Jun 20 23:06:40 PDT 2003 271009 with

Content-Type: text/html

Connection: Close

Terminate-Header: cvb098srnwe23

In this example, an element representing the entire document is created (402), either explicitly or implicitly. When the "Termination-Token" element is gotten (402), it is determined to be an initiator (407), and the associated key, "cvb098srnwe23", is associated with the element representing the document (410). Various header elements are stored for later processing (413). The "Terminate-Header" element is determined to be a terminator (411), and its associated key, "cvb098srnwe23", is determined to match the key associated with the matching initiator (414). When the end of the header is encountered (403), it is determined that no termination is missing (404), because the key associated with the initiator was matched in the terminator. The document is therefore processed (408). An example of processing the document is to accept the data as complete and legitimate, for example by retrieving another document from the specified location or (not shown) accepting a document following the HTTP header. In other examples (not shown), a missing terminator or an absent or mismatching key associated with the terminator would have caused the terminator to be not found (411) or ignored (415) respectively, and the termination would have been determined to be missing (404), causing the document to be rejected (405). This would, for example, protect against an HTTP response splitting attack in which a header is ended prematurely by injected content and a second header is provided.

Figure 5:
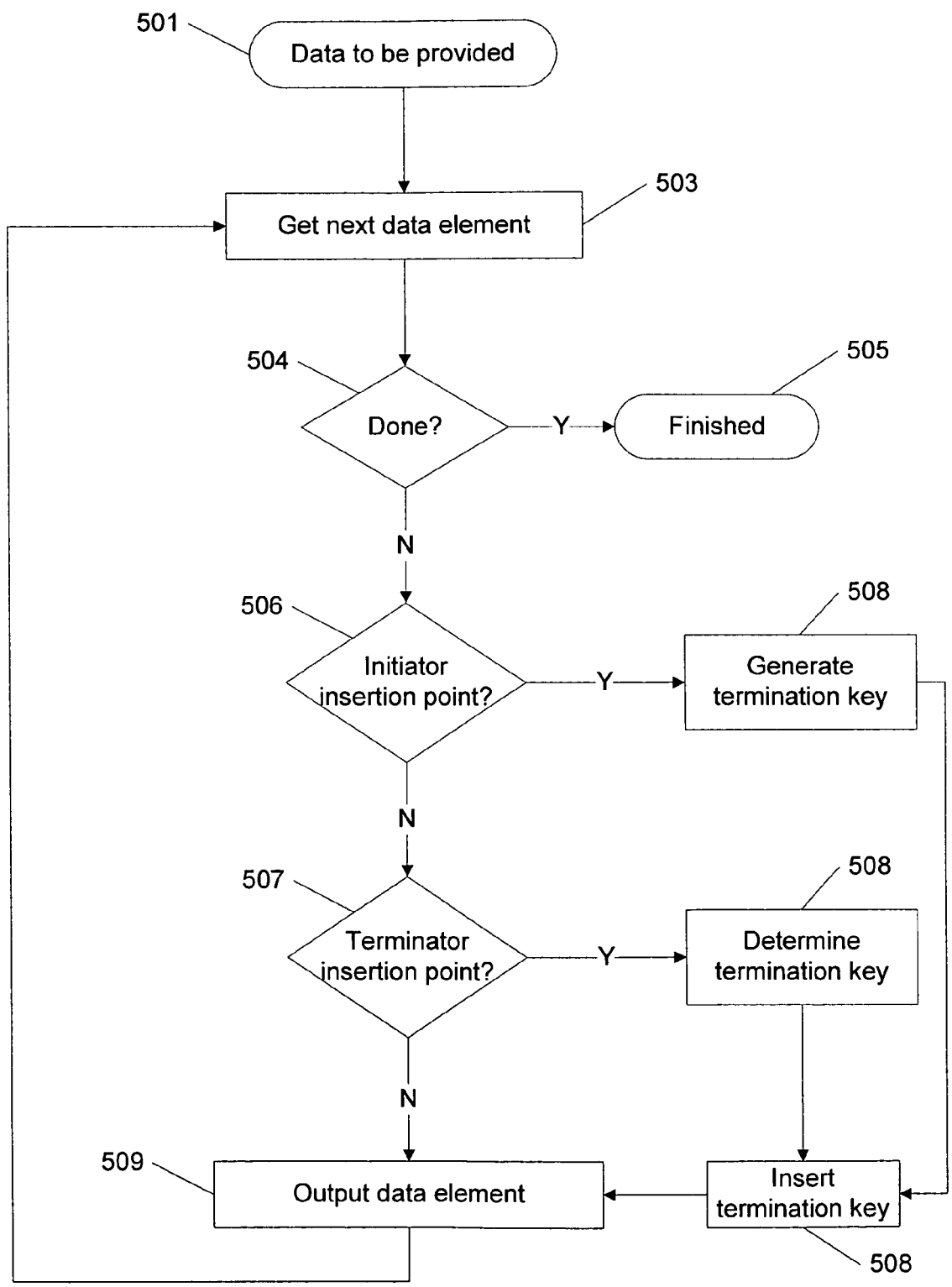
FIG. 5 is a flow diagram of a method for indicating areas of a document to protect, according to some embodiments.

FIG. 5 is a flow diagram of a method for indicating areas of a document to protect, according to some embodiments. In some embodiments, the method of this FIG. 5 may be associated with a server such as document server 103 of FIG. 1, for example with a web server. In some embodiments, the method of this FIG. 5 may be performed by computer software associated with document creation and/or management, such as a document editor or content manager. In this example, data associated with a document is to be provided (501), for example in response to a request for a document over a network such as network 102 of FIG. 1, or because a document has been created and/or saved.

The next data element may be gotten (503), for example by reading from disk or memory. If it is determined that the document is complete (504), then in this example processing is complete (505). In some embodiments, the end of a document may be considered a terminator insertion point, as discussed in conjunction with 508 of this FIG. 5.

It may be determined whether an initiator insertion point has been reached (506). An initiator insertion point refers herein to a place within document data at which an initiator exists or may be inserted. Examples of an initiator insertion point include the beginning of a document, the beginning of a predetermined type of data element, and document data that is specifically designated as being an initiator insertion point, for example via the presence of an embedded code indicating that a key is to be inserted. Examples of initiators are discussed in conjunction with 303 of FIGS. 3 and 203 of FIG. 2.

If it is determined that an initiator insertion point has been reached (506), then in this example a termination key is generated (507). An example of generating a termination key is to generate a termination key randomly, or according to a predetermined sequence such as a pseudorandom sequence. The termination key may be inserted (511). An example of inserting a termination key is to insert the key into a pre-existing initiator such as an <HTML> tag in a document. Another example of inserting a termination key is to create an initiator and insert the initiator with associated key, for example an initiator such as "Termination-Token" in an HTTP header. Examples of the use of such initiators are discussed in conjunction with FIG. 4. The data element may be output (510), and the next data element may be gotten (503).

If it is determined that an initiator insertion point has not been reached (506), then in this example it is determined whether a terminator insertion point has been reached (508). A terminator insertion point refers herein to a place within document data at which a terminator exists or may be inserted. Examples of a termination insertion point include the end of a document, the end of a predetermined type of data element, the end of a data element for which an associated initiator was associated with a key, and document data that is specifically designated as being a terminator insertion point, for example via the presence of a embedded code indicating that a key is to be inserted. Examples of terminators are discussed in conjunction with 304 of FIGS. 3 and 204 of FIG. 2.

If it is determined that a terminator insertion point has been reached (508), then in this example a termination key is determined (509). An example of determining a termination key is to retrieve a termination key associated with an element being terminated, such as the key used in a corresponding initiator. The termination key may be inserted (511). An example of inserting a termination key is to insert the key into a pre-existing terminator such as an </HTML> tag in a document. Another example of inserting a termination key is to create a terminator and insert the terminator with associated key, for example a terminator such as "Terminate-Header" in an HTTP header. Examples of the use of such terminators are discussed in conjunction with FIG. 4. The data element may be output (510), and the next data element may be gotten (503).

If it is determined that a terminator insertion point has not been reached (508), then in this example the data element is output (510) and the next data element is gotten (503).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for document integrity, comprising:
   receiving an electronic document via an electronic network;
   detecting an initiator, wherein the initiator is associated with an element, wherein the element is associated with the document; and wherein the initiator is associated with a key;
   detecting an end of the document;
   determining that no terminator matching the key has been detected; and
   rejecting the element.

2. The method of claim 1, wherein the document is associated with HTML.

3. The method of claim 1, wherein the document is associated with an HTTP header.

4. The method of claim 1, wherein the element is associated with an HTML tag.

5. The method of claim 1, wherein the element is associated with a line in an HTTP header.

6. The method of claim 1, further comprising detecting a terminator, wherein the terminator corresponds to the initiator.

7. The method of claim 6, further comprising determining a second key, wherein the second key is associated with the terminator, comparing the second key to the key, and determining that the second key does not match the key.

8. The method of claim 7, wherein the second key is null.

9. The method of claim 1, wherein the element is the document.

10. The method of claim 1, wherein rejecting the element includes rejecting the document.

11. The method of claim 1, wherein the initiator is augmented by the key.

12. The method of claim 1, wherein the key is included in a tag that also includes the initiator.

13. A computer program product for document integrity, the computer program product being embodied in a computer readable storage medium and comprising computer instructions for:
   receiving an electronic document via an electronic network;
   detecting an initiator, wherein the initiator is associated with an element, wherein the element is associated with the document; and wherein the initiator is associated with a key;
   detecting an end of the document;
   determining that no terminator matching the key has been detected; and
   rejecting the element.

14. The product of claim 13, further comprising computer instructions for detecting a terminator, wherein the terminator corresponds to the initiator.

15. The product of claim 14, further comprising computer instructions for determining a second key, wherein the second key is associated with the terminator, comparing the second key to the key, and determining that the second key does not match the key.

16. The computer program product of claim 13, wherein the document is associated with HTML.

17. The product of claim 13, wherein the document is associated with an HTTP header.

18. The product of claim 13, wherein the element is associated with an HTML tag.

19. The product of claim 13, wherein the element is associated with a line in an HTTP header.

20. The product of claim 13, wherein the second key is null.

21. The product of claim 13, wherein the element is the document.

22. The product of claim 13, wherein rejecting the element includes rejecting the document.

23. The product of claim 13, wherein the initiator is augmented by the key.

24. The product of claim 13, wherein the key is included in a tag that also includes the initiator.

25. A method for document integrity, comprising:
- detecting an initiator insertion point in an electronic document;
- generating a key;
- associating the key with an initiator at the initiator insertion point;
- associating the key with a terminator at a termination insertion point, wherein the terminator corresponds to the initiator; and
- electronically transmitting the document.

26. The method of claim 25, wherein the initiator insertion point is associated with the beginning of a document.

27. The method of claim 25, wherein detecting the initiator insertion point includes detecting the initiator.

28. The method of claim 25, wherein the initiator insertion point is associated with an embedded code.

29. The method of claim 25, wherein the terminator insertion point is associated with the end of a document.

30. The method of claim 25, wherein the terminator insertion point is associated with a terminator.

31. The method of claim 25, wherein the terminator insertion point is associated with an embedded code.

32. The method of claim 25, performed by computer software associated with electronic document creation.

33. The method of claim 25, performed at a web server.

34. The method of claim 25, wherein associating the key with the initiator includes inserting the key at the initiator insertion point, and wherein associating the key with the terminator includes inserting the key at the terminator insertion point.

35. The method of claim 25, wherein electronically transmitting the document includes storing the document.

36. The method of claim 25, wherein electronically transmitting the document includes sending the document over an electronic network.

37. A system for document integrity, comprising:
- a processor configured to:
  - receive an electronic document via an electronic network;
  - detect an initiator, wherein the initiator is associated with an element, wherein the element is associated with the document, and wherein the initiator is associated with a key;
  - detect an end of the document;
  - determine that no terminator matching the key has been detected; and
  - reject the element; and
- a memory coupled with the processor, wherein the memory provides instructions to the processor.

38. The system of claim 37, wherein the document is associated with HTML.

39. The system of claim 37, wherein the document is associated with an HTTP header.

40. The system of claim 37, wherein the element is associated with an HTML tag.

41. The system of claim 37, wherein the element is associated with a line in an HTTP header.

42. The system of claim 37, wherein the processor is further configured to detect a terminator, wherein the terminator corresponds to the initiator.

43. The system of claim 42, wherein the processor is further configured to determine a second key, wherein the second key is associated with the terminator, compare the second key to the key, and determine that the second key does not match the key.

44. The system of claim 43, wherein the second key is null.

45. The system of claim 37, wherein the element is the document.

46. The system of claim 37, wherein rejecting the element includes rejecting the document.

47. The system of claim 37, wherein the initiator is augmented by the key.

48. The system of claim 37, wherein the key is included in a tag that also includes the initiator.

49. A computer program product for document integrity, the computer program product being embodied in a computer readable storage medium and comprising computer instructions for:
- detecting an initiator insertion point in an electronic document;
- generating a key;
- associating the key with an initiator at the initiator insertion point;
- associating the key with a terminator at a terminator insertion point, wherein the terminator corresponds to the initiator; and
- electronically transmitting the document.

50. The product of claim 49, wherein the initiator insertion point is associated with the beginning of a document.

51. The product of claim 49, wherein detecting the initiator insertion point includes detecting the initiator.

52. The product of claim 49, wherein the initiator insertion point is associated with an embedded code.

53. The product of claim 49, wherein the terminator insertion point is associated with the end of a document.

54. The product of claim 49, wherein the terminator insertion point is associated with a terminator.

55. The product of claim 49, wherein the terminator insertion point is associated with an embedded code.

56. The product of claim 49, performed by computer software associated with electronic document creation.

57. The product of claim 49, wherein the computer instructions further comprise instructions for a web server.

58. The product of claim 49, wherein associating the key with the initiator includes inserting the key at the initiator insertion point, and wherein associating the key with the terminator includes inserting the key at the terminator insertion point.

59. The product of claim 49, wherein electronically transmitting the document includes storing the document.

60. The product of claim 49, wherein electronically transmitting the document includes sending the document over an electronic network.

61. A system for document integrity, comprising:
- a processor configured to:
  - detect an initiator insertion point in an electronic document;
  - generate a key;
  - associate the key with an initiator at the initiator insertion point;
  - associate the key with a terminator at a terminator insertion point, wherein the terminator corresponds to the initiator; and
  - electronically transmit the document; and a memory coupled with the processor, wherein the memory provides instructions to the processor.

62. The system of claim 61, wherein the initiator insertion point is associated with the beginning of a document.

63. The system of claim 61, wherein detecting the initiator insertion point includes detecting the initiator.

64. The system of claim 61, wherein the initiator insertion point is associated with an embedded code.

65. system of claim 61, wherein the terminator insertion point is associated with the end of a document.

66. The system of claim 61, wherein the terminator insertion point is associated with a terminator.

67. The system of claim 61, wherein the terminator insertion point is associated with an embedded code.

68. The system of claim 61, performed by computer software associated with electronic document creation.

69. The system of claim 61, wherein the processor is further configured as a web server.

70. The system of claim 61, wherein associating the key with the initiator includes inserting the key at the initiator insertion point, and wherein associating the key with the terminator includes inserting the key at the terminator insertion point.

71. The system of claim 61, wherein electronically transmitting the document includes storing the document.

72. The system of claim 61, wherein electronically transmitting the document includes sending the document over an electronic network.

* * * * *